US012451733B2

(12) United States Patent
Ichikawa et al.

(10) Patent No.: US 12,451,733 B2
(45) Date of Patent: Oct. 21, 2025

(54) WIRELESS POWER RECEIVING DEVICE, WIRELESS POWER TRANSMITTING DEVICE, WIRELESS EARPHONE, LED DEVICE, AND WIRELESS POWER TRANSMITTING AND RECEIVING SYSTEM

(71) Applicant: MAXELL, LTD., Tokyo (JP)

(72) Inventors: Katsuei Ichikawa, Tokyo (JP); Yasuo Yahagi, Tokyo (JP); Hitoshi Akiyama, Kyoto (JP)

(73) Assignee: MAXELL, LTD., Kyoto (JP)

( * ) Notice: Subject to any disclaimer, the term of this patent is extended or adjusted under 35 U.S.C. 154(b) by 587 days.

(21) Appl. No.: 17/763,737

(22) PCT Filed: Sep. 26, 2019

(86) PCT No.: PCT/JP2019/037972
§ 371 (c)(1),
(2) Date: Mar. 25, 2022

(87) PCT Pub. No.: WO2021/059453
PCT Pub. Date: Apr. 1, 2021

(65) Prior Publication Data
US 2022/0320910 A1 Oct. 6, 2022

(51) Int. Cl.
*H02J 50/27* (2016.01)
*H02J 7/00* (2006.01)
(Continued)

(52) U.S. Cl.
CPC .......... *H02J 50/27* (2016.02); *H02J 7/00712* (2020.01); *H02J 50/402* (2020.01);
(Continued)

(58) Field of Classification Search
CPC ...................................................... H02J 50/27
(Continued)

(56) References Cited

U.S. PATENT DOCUMENTS

2010/0315045 A1   12/2010   Zeine
2010/0323616 A1*  12/2010   Von Novak ............. H02J 50/12
                                                       455/41.1
(Continued)

FOREIGN PATENT DOCUMENTS

JP   2008-199857 A   8/2008
JP   2013-511955 A   4/2013
(Continued)

OTHER PUBLICATIONS

International Search Report PCT/JP2019/037972 dated Dec. 10, 2019.

*Primary Examiner* — Yalkew Fantu
(74) *Attorney, Agent, or Firm* — Mattingly & Malur, PC

(57) ABSTRACT

A wireless power receiving device (WPRD) comprises an RFID responder and a beacon signal oscillator to transmit an RFID response in a case where there is no electric power which is necessary for transmission of a beacon signal. A wireless power transmitting device (WPTD) operates in a wide area power transmission mode for transmitting the electric power at a wide angle toward a direction that it receives the RFID response. When the WPRD receives the electric power in a wide area power transmission mode and transmission of the beacon signal becomes possible, it transmits the beacon signal. The WPTD operates in a centralized power transmission mode for transmitting the electric power at a narrower angle toward a direction receiving the beacon signal. Also, during the centralized power transmission mode, it cyclically performs transmission and reception of the beacon signal to detect positions of the WPRD and the WPTD.

10 Claims, 12 Drawing Sheets

(51) Int. Cl.
  *H02J 50/40* (2016.01)
  *H04R 1/10* (2006.01)
  *H05B 45/30* (2020.01)
(52) U.S. Cl.
  CPC ......... *H04R 1/1016* (2013.01); *H04R 1/1025* (2013.01); *H04R 1/1041* (2013.01); *H04R 2420/07* (2013.01); *H05B 45/30* (2020.01)
(58) Field of Classification Search
  USPC .......................................................... 320/108
  See application file for complete search history.

(56) References Cited

U.S. PATENT DOCUMENTS

| | | | |
|---|---|---|---|
| 2012/0235636 A1* | 9/2012 | Partovi | H02J 7/0042 320/108 |
| 2013/0005252 A1* | 1/2013 | Lee | H02J 50/12 307/18 |
| 2021/0296923 A1* | 9/2021 | Wan | H02J 7/00714 |

FOREIGN PATENT DOCUMENTS

| | | |
|---|---|---|
| JP | 2014-223018 A | 11/2014 |
| JP | 2017-212849 A | 11/2017 |

\* cited by examiner

FLOWCHART DIAGRAM ILLUSTRATING FLOW FROM START OF POWER TRANSFER TO END OF CHARGING ON POWER RECEIVING DEVICE SIDE

100g

100h

WIRELESS POWER RECEIVING DEVICE, WIRELESS POWER TRANSMITTING DEVICE, WIRELESS EARPHONE, LED DEVICE, AND WIRELESS POWER TRANSMITTING AND RECEIVING SYSTEM

TECHNICAL FIELD

The present invention pertains to a wireless power receiving device, a wireless power transmitting device, and a wireless power transmission and reception technology which uses them and relates to, for example, technologies of wireless power charging for performing non-contact charging on batteries of small-sized portable devices such as an IoT device, a portable terminal, and so forth and of wireless power transfer to a sensor and so forth mounted on a rotor and so forth.

BACKGROUND ART

The portable devices such as portable terminals and so forth are in a situation where miniaturization and thinning thereof are advanced while connector connection when charging is troublesome and demand for charging by wireless power transfer is growing. The one which uses radio waves such as microwaves and so forth, an electromagnetic induction system which uses magnetic field coupling, and so forth are now under consideration in the wireless power transfer. Among them, although the electromagnetic induction system is on the order of about several cm in transmission distance, since efficiency which is as high as about 90% is obtained in transmission efficiency of coils which are used for power transmission and reception, productization of wireless power charging devices for the portable devices is being advanced. In contrast thereto, although microwave power transfer which used a GHz band is bad in transmission efficiency, a transmission distance which is on the order of several meters can be expected and therefore, for example, also power charging which is performed by wireless power transmission while calling on the portable device and wireless power charging to the IoT devices such as sensors and so forth installed for detection of gas and water amounts used can be expected, and therefore practical application thereof is desired.

Patent Literature 1 is the one which realizes the wireless power transmission which uses the microwaves. In Patent Literature 1, a beacon signal from a beacon signal oscillator loaded on a power receiving device is received by a phased array antenna of a power transmitting device. At that time, the power transmitting device transmits the electric power by adjusting a phase of the phased array antenna so as to transmit it in a direction which is opposite to a beacon signal propagation path from phase information on a received signal. Accordingly, even in a case of presence of an obstacle between a power transmission device and a reception device, a propagation path which avoids it is formed and therefore comparatively high efficiency can be expected even in the microwave power transfer which is said to be low in efficiency.

CITATION LIST

Patent Literature

PTL 1: Japanese Patent Application Laid-Open No. 2014-223018

SUMMARY OF INVENTION

Technical Problem

In Patent Literature 1, since the beacon signal from the beacon signal oscillator loaded on the power receiving device is received by the phased array antenna of the power transmitting device and thereby the electric power is transmitted in a direction which is opposite to a reception propagation path thereof, it has had a problem that when a battery remaining quantity of the power receiving device is small and the beacon signal oscillator cannot be driven, a power transmission direction from the power transmitting device to the power receiving device cannot be obtained and power transmission cannot be performed.

The present invention has been made in order to solve the abovementioned problem and aims to provide a technology which makes wireless power transfer possible even in a case where the battery remaining quantity is small, while promoting miniaturization and cost reduction of the power receiving device.

Solution to Problem

In order to solve the abovementioned problem, the present invention is equipped with configurations which are described in the scope of the claims. Taking up one example thereof, the present invention is a wireless power receiving device including an RFID responder, a beacon signal oscillator which generates a beacon signal, a power reception antenna, an RFID-beacon changeover switch which is connected to each of the beacon signal oscillator, the RFID responder and the power reception antenna, and a power reception side control circuit which performs switching control of the RFID-beacon changeover switch, in which the beacon signal oscillator is connected to a first input end of the RFID-beacon changeover switch, the RFID responder is connected to a second input end of the RFID-beacon changeover switch, the power reception antenna is connected to a first output end of the RFID-beacon changeover switch, and in a case where there is no electric power for transmitting the beacon signal in the wireless power receiving device, the power reception side control circuit controls to connect to a first system which connects the RFID responder with the power reception antennal and disconnects the beacon signal oscillator from the power reception antenna, and in a case where there is the electric power for transmitting the beacon signal in the wireless power receiving device, the power reception side control circuit controls to connect to a second system which connects the beacon signal oscillator with the power reception antenna and disconnects the RFID responder from the power reception antenna.

Advantageous Effects of Invention

According to one aspect of the present invention, a technology which can perform the wireless power transfer even in a case where the battery remaining quantity is small while promoting miniaturization and cost reduction of the power receiving device can be provided. Problems, configurations, and effects other than the previously mentioned ones will become apparent from the following description of embodiments.

DESCRIPTION OF EMBODIMENT

First Embodiment

Figure 1:
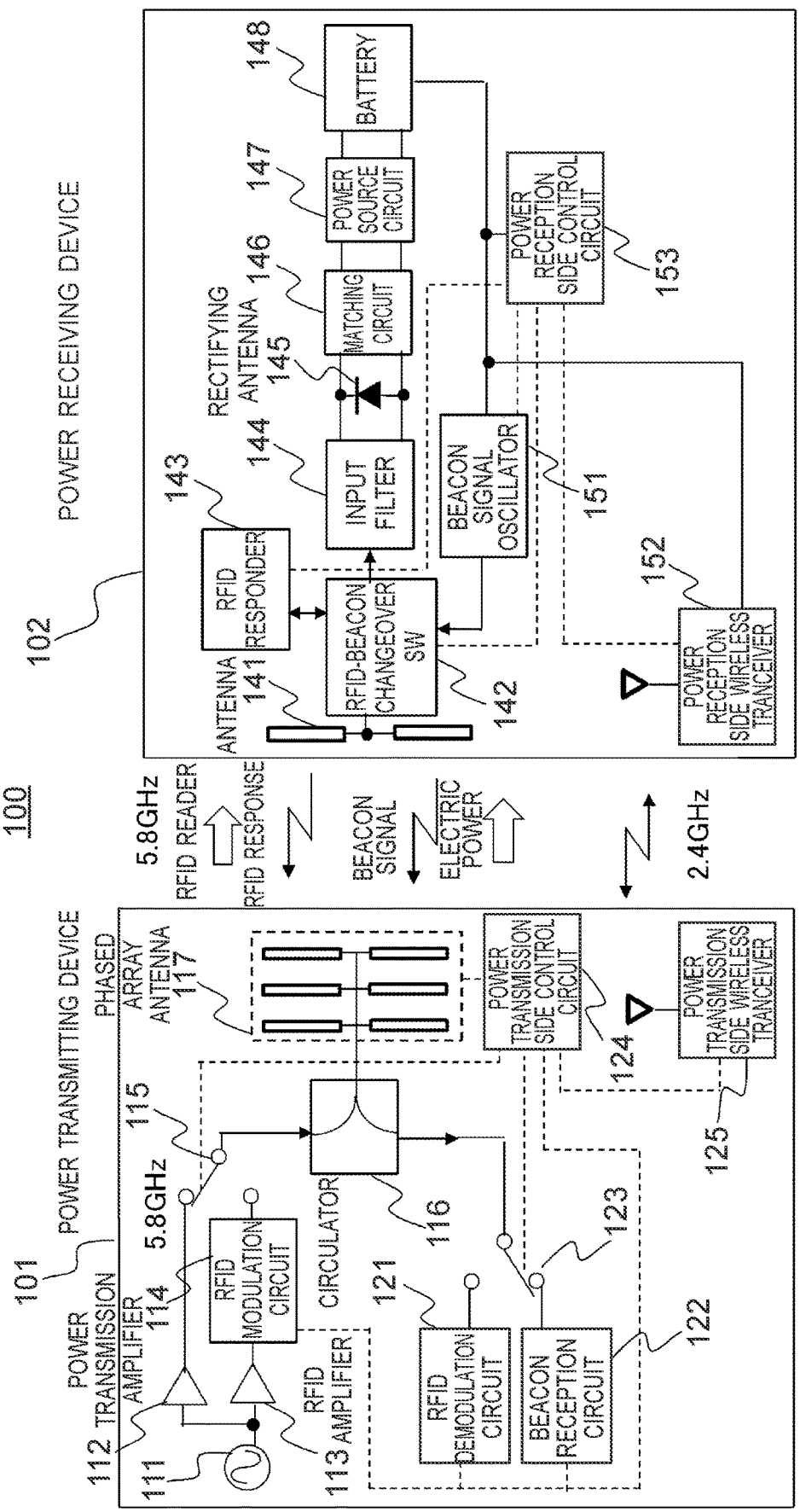
FIG. 1 is a diagram illustrating a configuration of a power transmitting and receiving system which pertains to a first embodiment.

FIG. 1 is a diagram illustrating a configuration of a power transmitting and receiving system 100 which pertains to the first embodiment.

As illustrated in FIG. 1, the power transmitting and receiving system 100 is a system which transfers the electric power from a wireless power transmitting device (in the following, abbreviated as a "power transmitting device") 101 to a wireless power receiving device (in the following, abbreviated as a "power receiving device") 102. The power transmitting device 101 includes an RFID reader (which is configured by including an oscillator 111, a power transmission amplifier 112, an RFID amplifier 113 which is adapted to perform power transmission for reading RFID, an RFID modulation circuit 114 which is adapted to perform writing into the RFID, an RFID demodulation circuit 121 which demodulates a modulated data signal from an RFID responder), a first changeover switch 115, a circulator 116 which separates transmission on the power transmission side and reading by the RFID reader and reception of the beacon signal depending on a direction of the signal, a phased array antenna 117 which is capable of adjusting a phase of a signal for transferring the electric power to each antenna element and making it have antenna directivity in a desired direction, a beacon reception circuit 122 which receives the beacon signal from the power receiving device 102, a second changeover switch 123, a power transmission side control circuit 124 which controls switching between the first changeover switch 115 and a second changeover switch 123, controls a phase of the phased array antenna 117, and controls operations of the beacon reception circuit 122 and a power transmission side wireless machine 125, and the power transmission side wireless machine 125 which is adapted to perform communication with the power receiving device 102. The power transmission side wireless machine 125 is, for example, a 2.4 GHz-band Bluetooth (registered trademark) and so forth are used. Incidentally, for a power transmission frequency, a 5.8 GHz band for which miniaturization of the antenna is promoted is used in an ISM band in which utilization thereof for the one other than wireless communication can be made comparatively easily.

In addition, the power receiving device 102 includes a power reception antenna 141, an RFID-beacon changeover switch 142 (illustrated as an "RFID-beacon changeover SW"), an RFID responder 143, an input filter 144, a rectifying antenna 145 which converts the received electric power to a DC power, a matching circuit 146, a power source circuit 147, a battery 148, a beacon signal oscillator 151, a power reception side wireless machine 152 which is adapted to perform wireless communication with the power transmitting device 101, and a power reception side control circuit 153 which controls the RFID-beacon changeover switch 142, the beacon signal oscillator 151. and so forth.

In the power transmitting and receiving system 100, the operation modes of the power transmitting device 101 and the power receiving device 102 are switched in association with a switching operation of the RFID-beacon changeover switch 142. Next, each operation mode in the power transmitting device 101 will be described.

(RFID Reader Mode)

In the RFID reader mode, the power transmission side control circuit 124 switches the first changeover switch 115 to the RFID modulation circuit 114 side and the second changeover switch 123 to the RFID demodulation circuit 121 side. Thereby, a signal from the oscillator 111 is amplified by the RFID amplifier 113, and in a case where writing into the RFID is necessary, is subjected to amplitude modulation by the RFID modulation circuit 114 and is input into the phased array antenna 117 via the first changeover switch 115 and the circulator 116. In the phased array antenna 117, an RFID reader signal is output in a desired direction by phase control of the power transmission side control circuit 124. At that time, in a case where a response is issued from the RFID responder 143 which is loaded on the power receiving device 102, a response signal thereof becomes a reflected wave of the RFID reader signal and is received by the phased array antenna 117. Then, the reflected wave of the RFID reader signal is input into the RFID demodulation circuit 121 via the circulator 116 and the second changeover switch 123 and demodulates the signal from the RFID responder 143. In addition, phase information on each antenna element of the phased array antenna 117 receiving at this time is input into the power transmission side control circuit 124. Incidentally, the frequency of the RFID reader signal is, the frequency which is the same as 5.8 GHz which is used for wireless power transfer is used.

(Beacon Reception Mode)

In the beacon reception mode, the power transmission side control circuit 124 switches the second changeover switch 123 to the beacon reception circuit 122 side. Thereby, a beacon signal from the power receiving device 102 is received by the phased array antenna 117 and is input into the beacon reception circuit 122 via the circulator 116, the second changeover switch 123. A beacon reception signal received at this time and phase information of the phased array antenna 117 are input into the power transmission side control circuit 124.

(Power Transmission Mode)

In the power transmission mode, the power transmission side control circuit 124 switches the first changeover switch 115 to the power transmission amplifier 112 side. Thereby, a signal from the oscillator 111 is amplified by the power transmission amplifier 112 and transmitted from the phased array antenna 117 via the first changeover switch 115 and the circulator 116. At this time, the power transmission side control circuit 124 adjusts directivity of the phased array antenna 117. Thereby, it is transmitted with the directivity that the power transmission side control circuit 124 adjusted.

In addition, each operation mode of the power receiving device 102 will be described.

(RFID Mode)

In the RFID mode, the power reception side control circuit 153 switches the RFID-beacon changeover switch 142 to the RFID responder 143 side. Thereby, when the RFID responder 143 is connected with the power reception antenna 141 and receives the RFID reader signal from the power transmitting device 101, it outputs a response signal which corresponds thereto.

(Beacon Output Mode)

In the beacon output mode, the power reception side control circuit 153 switches the RFID-beacon changeover switch 142 to the beacon signal oscillator 151 side. Thereby, the beacon signal oscillator 151 is connected with the power reception antenna 141 and the beacon signal is output from the power receiving device 102. Incidentally, the beacon signal is output only in a case where the power reception side control circuit 153 decides that charging of the battery 148 is necessary, and is not transmitted in a case of full charge.

(Power Reception Mode)

In the power reception mode, the power reception side control circuit 153 switches the RFID-beacon changeover switch 142 to the input filter 144 side. Thereby, the input filter 144 is connected with the power reception antenna 141, received electric power is converted to a DC voltage by the rectifying antenna 145, impedance matching is performed by the matching circuit 146, and thereafter it is converted to a steady voltage by the power source circuit 147 and is charged to the battery 148. Control of transmitted electric power adjustment and so forth at this-time charging is performed by communicating with the power transmission side wireless machine 125 of the power transmitting device 101 via the power reception side wireless machine 152.

In the above configuration, when the power transmitting device 101 is in the RFID reader mode, the power receiving device 102 becomes the RFID mode. In addition, when the power receiving device 102 is in the beacon output mode, the power transmitting device 101 enters the beacon reception mode, and when the power transmitting device 101 is in the power transmission mode, the power receiving device 102 enters the power reception mode, and thereby communication and wireless electric power transmission become possible between the power transmission side and the power reception side. In particular, in the RFID mode, even in a case where the battery remaining quantity of the power receiving device 102 is small and even in a device which has no battery, the operation becomes possible. Incidentally, in a case where it receives a signal which is close to a power transmission frequency via the phased array antenna 117, power transmission may not be performed or the power transmission may be performed by avoiding a signal arriving direction.

Figure 2:
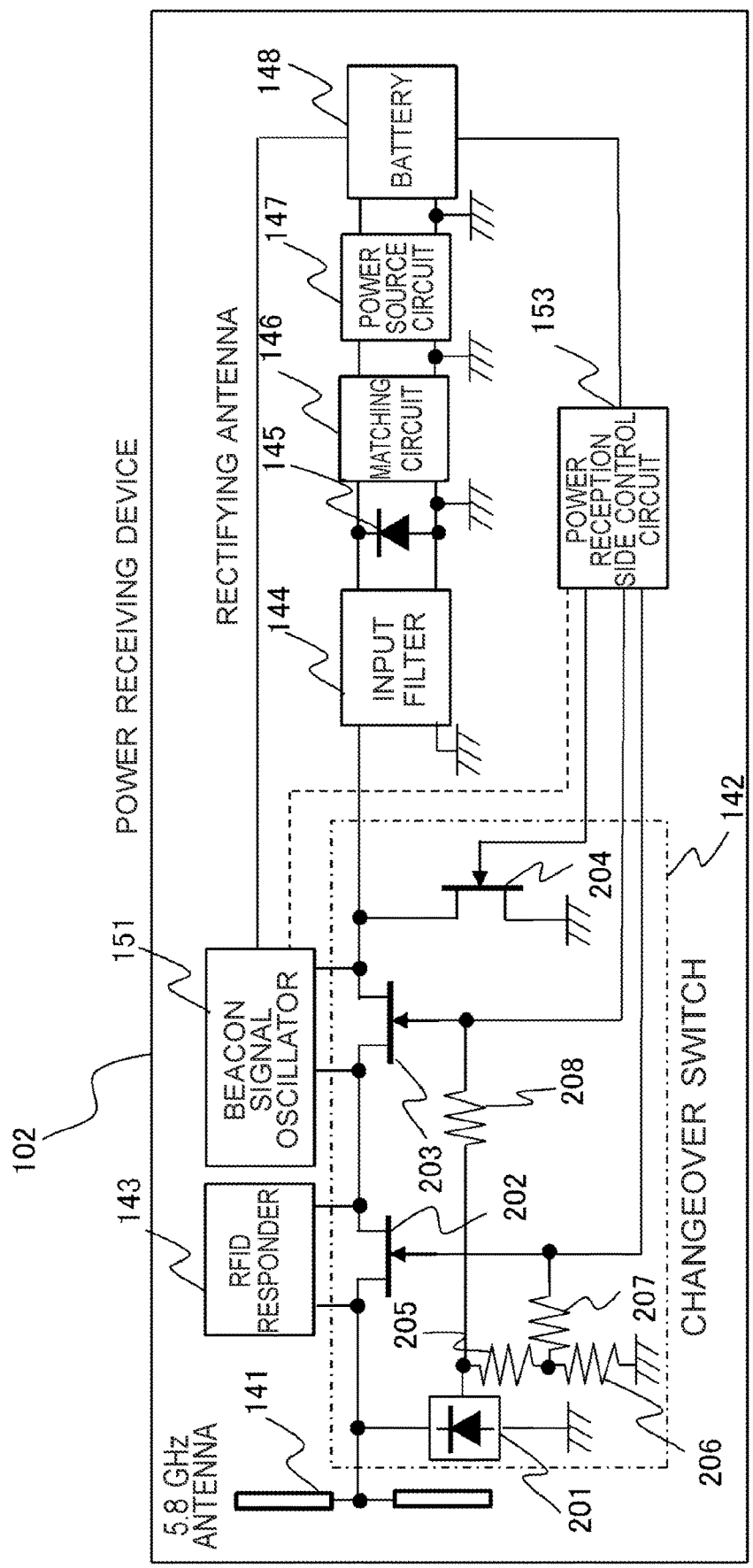
FIG. 2 is a diagram illustrating a configuration of an RFID-beacon changeover switch.

FIG. 2 is a diagram illustrating a configuration of the RFID-beacon changeover switch 142. As illustrated in FIG. 2, the RFID-beacon changeover switch 142 includes a wave detection circuit 201, a first field effect transistor 202, a second field effect transistor 203, a third field effect transistor 204, a first resistor 205, a second resistor 206, a third resistor 207, and a fourth resistor 208.

The RFID-beacon changeover switch 142 is configured such that when the wave detection circuit 201 is connected to an input end of the power reception antenna 141 and there is the received electric power, it outputs a wave detection voltage. In addition, respective drains and respective source terminals of the first field effect transistor 202, the second field effect transistor 203, the third field effect transistor 204 are connected to both ends of the RFID responder 143, the beacon signal oscillator 151 and the input filter 144 respectively, and these are serially connected to the power reception antenna 141. By configuring in this way, even in a state where the remaining quantity of the battery 148 of the power receiving device 102 is small and each of the first field effect transistor 202, the second field effect transistor 203, the third field effect transistor 204 of the RFID-beacon changeover switch 142 cannot be turned on, since these circuits are serially connected, they maintain some degree of impedance to the power reception antenna 141.

In the RFID mode, an output from the wave detection circuit 201 brings an output end of the beacon signal oscillator 151 into a short-circuited state via the fourth resistor 208 with the electric power that the power transmitting device 101 transmits. Thereby, although the RFID responder 143 and the input filter 144 are connected in series with each other, since an input impedance of the input filter 144 is comparatively low, the electric power which is received by the RFID reader is mostly applied to both ends of the RFID responder 143. Thus, the operation of the RFID responder 143 becomes possible.

In the beacon output mode, the power reception side control circuit 153 lowers a gate voltage of the second field effect transistor 203 and brings it into an OFF state and applies ON voltages to gates of the first field effect transistor 202, the third field effect transistor 204 and thereby an output end of the beacon signal oscillator 151 is connected to the power reception antenna 141. Thereby, the beacon signal is output from the power reception antenna 141.

In the power reception mode, since electric power which is higher than that of the RFID reader is received to the power reception antenna 141, a high voltage is output also to the wave detection circuit 201. Accordingly, at an output of the wave detection circuit 201, a voltage which is divided by the first resistor 205 and the second resistor 206 brings the gate of the first field effect transistor 202 into an ON state via the third resistor 207, and also the second field effect transistor 203 which is connected to the both output ends of the beacon signal oscillator 151 enters the ON state. Further, the power reception side control circuit 153 brings the third field effect transistor 204 into an OFF state and thereby the electric power received via the power reception antenna 141 is converted to a DC voltage by the rectifying antenna 145 via the input filter 144.

By forming so as to have the above configuration, even in a state where the remaining quantity of the battery 148 is small and the first field effect transistor 202, the second field effect transistor 203, and the third field effect transistor 204 cannot operate, the RFID-beacon changeover switch 142 is configured to be connectable to the RFID responder 143 and in addition both the beacon output mode and the power reception mode are switchable.

Figure 3:
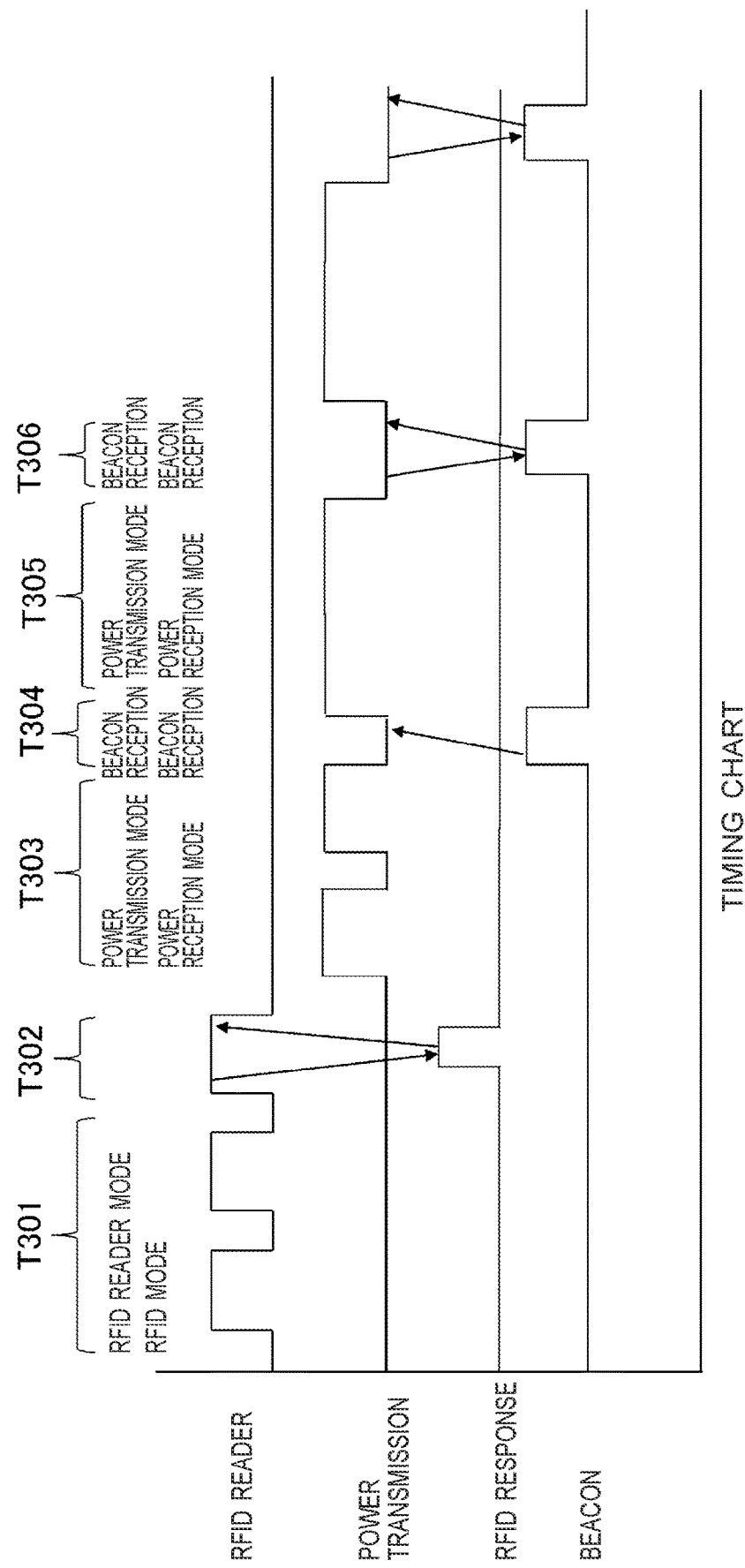
FIG. 3 is a timing chart when power transfer is started from a state where a battery remaining quantity of a power receiving device is small and a beacon signal cannot be output.

FIG. 3 is a timing chart when power transfer is started from a state where the battery remaining quantity of the power receiving device 102 is small and the beacon signal cannot be output.

As illustrated in FIG. 3, in the case where the battery remaining quantity is small and the beacon signal cannot be output, the power transmitting device 101 enters the RFID reader mode and the power receiving device 102 enters the RFID mode. In a case of receiving a signal from the RFID reader, the RFID responder 143 responds data such as identification information, a charge priority order, a received signal level, and so forth of the power receiving device 102 to the RFID reader. However, at this time, since a direction that the power receiving device 102 is located and which is viewed from the power transmitting device 101 is not found, the power transmitting device 101 waits for a reaction from the RFID reader while changing the directivity of the phased array antenna 117 (T301).

In a case where a response is made from the RFID reader (T302), the power transmitting device 101 switches to the power transmission mode, transmits the electric power in a direction that the reaction is made from the RFID, and the power receiving device 102 enters the power reception mode and charges the battery 148 (T303). At this time, in order to confirm whether the beacon signal is transmitted from the power receiving device 102 side, the power transmitting device 101 sometimes switches to the beacon reception mode and waits for transmission of the beacon signal.

Then, when the electric power which is necessary to output the beacon signal is accumulated in the battery 148 of the power receiving device 102, the power receiving device 102 enters the beacon output mode and the power transmitting device 101 receives the beacon signal (T304). The power transmitting device 101 decides the direction of the power receiving device 102 which is viewed from the power transmitting device 101 on the basis of a direction that the beacon signal is received.

The power transmitting device 101 receives the beacon signal, then enters the power transmission mode and transmits the electric power. In this power transmission mode, the power transmitting device 101 transmits the electric power by concentrating radio waves in the direction of the power receiving device 102 (narrowing an output direction). Accordingly, the power receiving device 102 is charged more effectively, that is, faster in comparison with power transmission at T303. The power transmission mode at T303 is called a wide area power transmission mode, and the power transmission mode at T305 is called a centralized power transmission mode. During charging, in particular, in the centralized power transmission mode, when the power receiving device 102 moves, it is necessary to adjust the directivity of the phased array antenna 117 for power transmission, and therefore the power transmitting device 101 periodically enters the beacon reception mode (T306). In a case where the power receiving device 102 becomes unable to receive the electric power in the centralized power transmission mode for some reason such as movement of the power receiving device 102 and so forth, the power receiving device 102 switches to the beacon output mode. Accordingly, since the power transmitting device 101 receives again the beacon signal, adjustment of the directivity of the phased array antenna 117 becomes possible.

Figure 4:
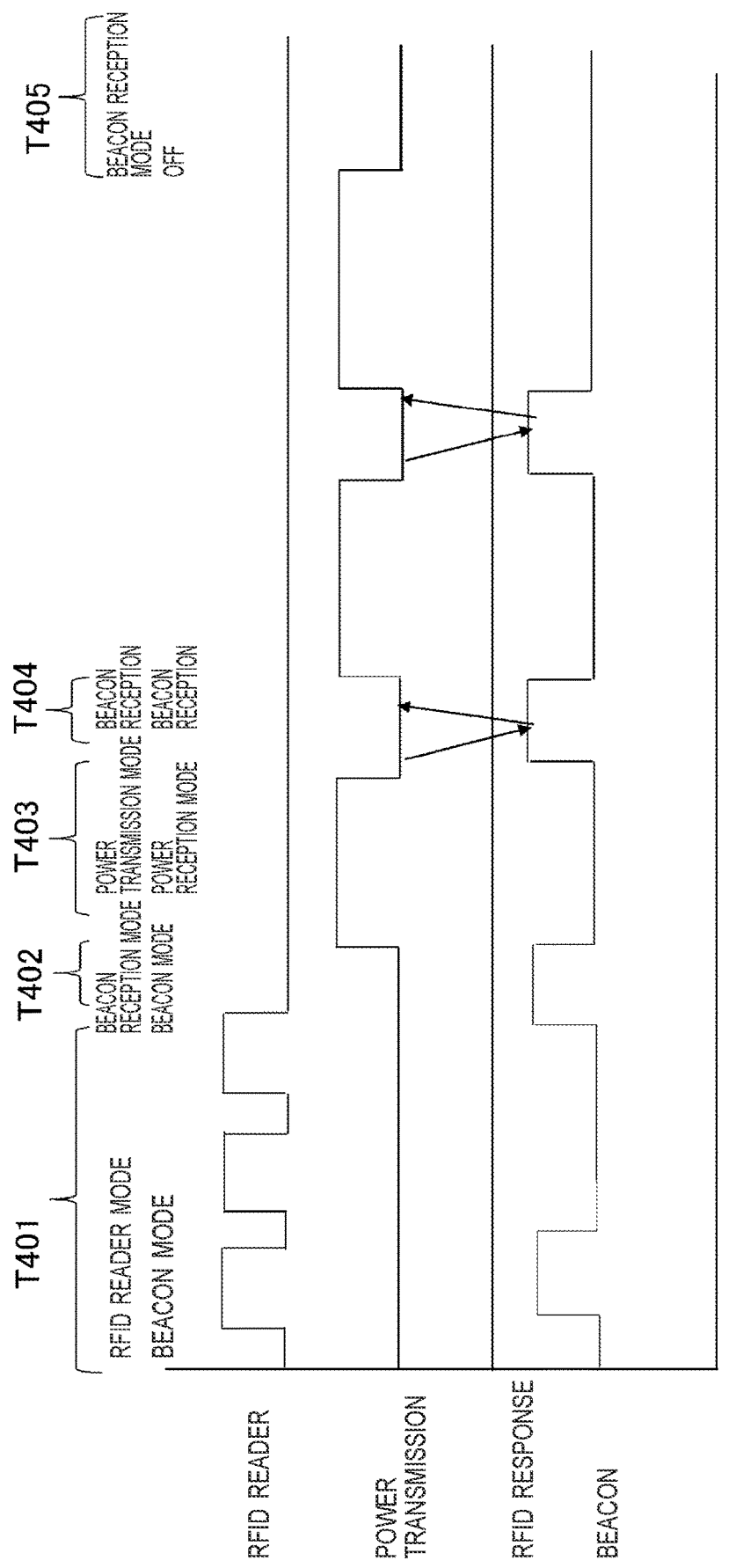
FIG. 4 is a timing chart in a case where the battery remaining quantity of the power receiving device is present and the beacon signal can be transmitted.

FIG. 4 is the one which illustrates a timing chart in a case where there is the battery remaining quantity of the power receiving device 102 and the beacon signal can be transmitted.

As illustrated in FIG. 4, since there is the battery remaining quantity, the power receiving device 102 is in the beacon mode. On the other hand, the power transmitting device 101 searches as to whether the power receiving device 102 which is in the RFID mode is present around it by serving as the RFID reader for a while in order to detect the power receiving device 102 which runs out of the battery remaining quantity and is in the RFID mode (T401). When it is found that there is no power receiving device 102 in the RFID mode after some time, the power transmitting device 101 transitions to the beacon reception mode.

Upon receiving the beacon signal of the power receiving device 102 (T402), the power transmitting device 101 enters the centralized power transmission mode, the power receiving device 102 enters the power reception mode, and charging to the battery 148 is started (T403). Incidentally, since it is necessary to periodically adjust the directivity of the phased array antenna 117 similarly to the case where there is no battery remaining quantity, the power transmitting device 101 switches to the beacon reception mode and also the power receiving device 102 switches to the beacon output mode. Thereby, adjustment of the directivity of the phased array antenna 117 becomes possible in the centralized power transmission mode (T404). In addition, in a case where charging of the power receiving device 102 is completed, outputting of the beacon signal is stopped. Thereby, the power transmitting device 101 stops power transmission (T405).

Figure 5:
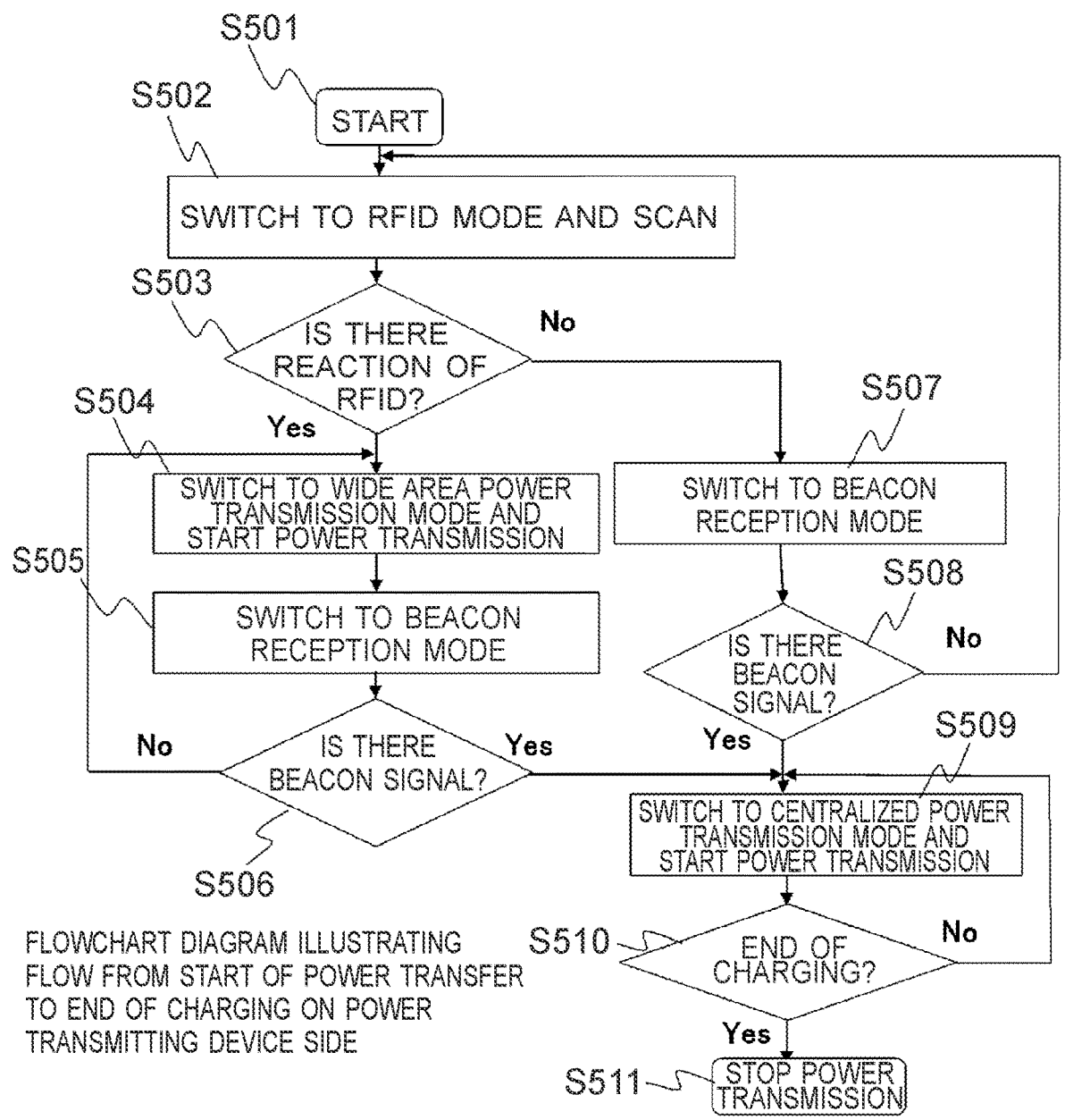
FIG. 5 is a flowchart illustrating an operation of a power transmitting device of the power transmitting and receiving system which pertains to the first embodiment.

FIG. 5 is a flowchart illustrating an operation of the power transmitting device 101 of the power transmitting and receiving system 100 which pertains to the first embodiment.

As illustrated in FIG. 5, when the power source of the power transmitting device 102 is turned on and processing is started (S501), the power transmitting device 101 switches it to the RFID reader mode and scans for a predetermined time as to whether there is no reaction from the RFID reader (S502). This scanning is performed while changing the directivity of the phased array antenna 107.

If there is the reaction from the RFID reader (S503: Yes), it switches the power transmitting device 101 to the wide area power transmission mode and starts power transmission (S504). At this time, the power transmission is performed by using the directivity of the phased array antenna 107 which is the same as that when detecting the RFID reader. When a predetermined time has elapsed, the power transmitting device 101 switches it to the beacon reception mode (S505).

In a case where it cannot detect the beacon signal (S506: No), it transitions to the wide area power transmission mode and again performs power transmission in the wide area power transmission mode (returns to S504).

When it detects the beacon signal at the time of the beacon power reception mode (D506: Yes), the power transmitting device 101 performs power transmission by switching it to the centralized power transmission mode (S509). While it is transmitting the electric power in the centralized power transmission mode, the power transmitting device 101 periodically switches it to the beacon reception mode after starting power transmission in the centralized power transmission mode, in order to grasp the position of the power receiving device 102 and then to adjust the directivity of the phased array antenna 117. Incidentally, also the power receiving device 102 periodically switches to the beacon output mode.

While it is in the centralized power transmission mode, the power receiving device 102 periodically confirms presence/absence of the beacon signal in this way and decides whether charging of the power receiving device 102 is finished depending on presence or absence of the beacon signal (S510). Upon completion of charging, since the power receiving device 102 stops transmission of the beacon signal. As a result, the power transmitting device 101 cannot receive the beacon signal, so it decides that charging is finished (S510: Yes) and stops power transmission (S511). In a case where it receives the beacon signal (S510: No), it continues the centralized power transmission mode (S509). Incidentally, decision of completion of charging may also be performed by transmitting charging termination information from the power reception side wireless machine 152 to the power transmission side wireless machine 125.

Incidentally, in step S502, in a case where there is no reaction as a result that the power transmitting device 101 scanned as to whether there is no reaction from the RFID reader in the RFID mode for a predetermined time (S503: No), the power transmitting device 101 switches it to the beacon mode (S507). In a case where there is no beacon signal from the power receiving device 102 (S508: No), since the power receiving device 102 is not present, the power transmitting device 101 enters the RFID mode, returns to step S502, and starts again scanning as to whether there is no reaction from the RFID reader.

On the other hand, in a case where it detects the beacon signal in step S508 (S508: Yes), power transmission is started by switching the power transmitting device 101 to the centralized power transmission mode (S509) and it performs power transmission until charging is finished (S510, S511).

Figure 6:
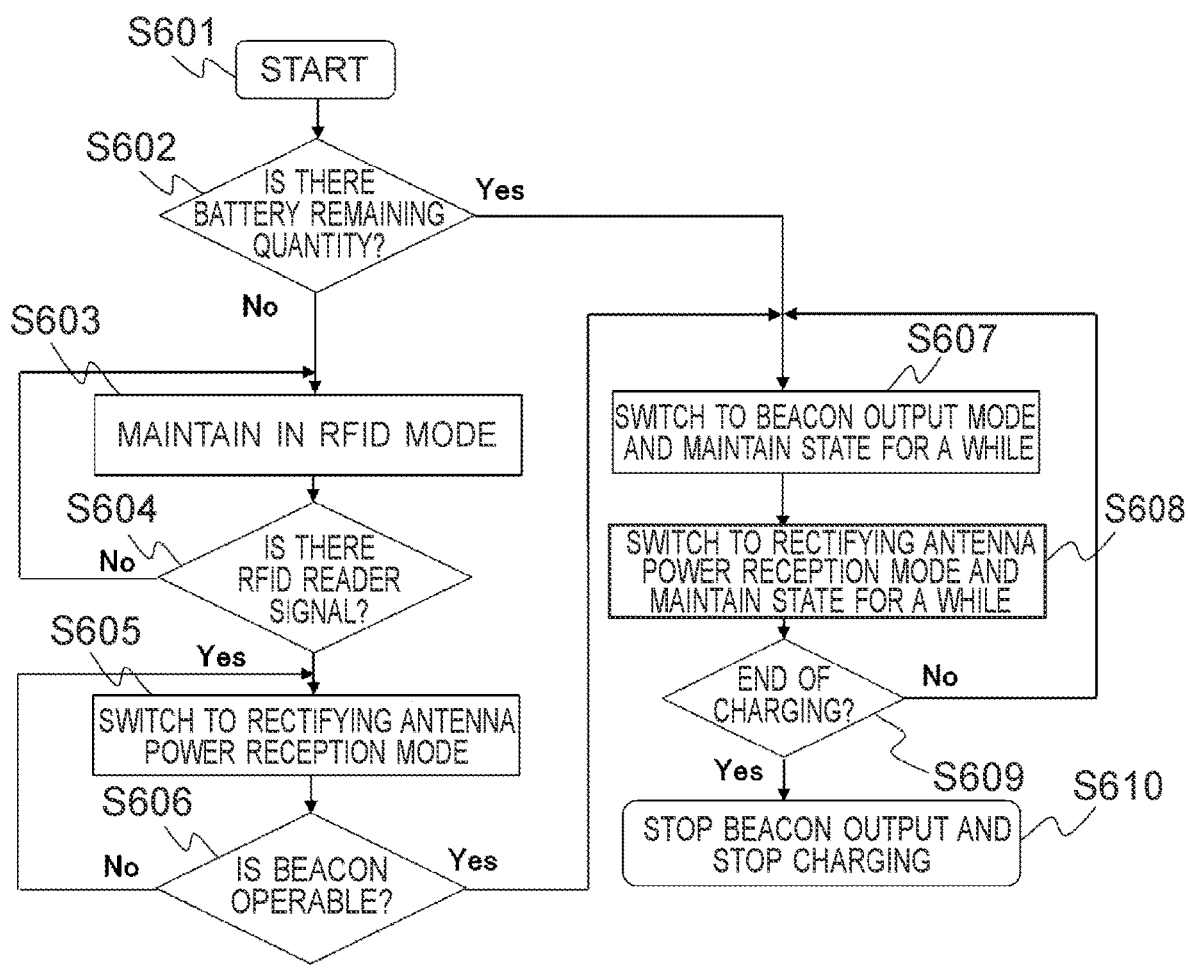
FIG. 6 is a flowchart illustrating an operation of the power receiving device of the power transmitting and receiving system which pertains to the first embodiment.

FIG. 6 is a flowchart illustrating an operation of the power receiving device 102 of the power transmitting and receiving system 100 which pertains to the first embodiment.

As illustrated in FIG. 6, the present processing starts with the power receiving device 102 confirming the state of the battery remaining quantity (S601). In a case where there is no battery remaining quantity and it cannot transmit the beacon signal (S602: No), the power receiving device 102 maintains the RFID mode (S603), and maintains the RFID mode until receiving a signal of the RFID reader.

When the power receiving device 102 receives an RFID response signal (S604: Yes), the power receiving device 102 switches it to the rectifying antenna power reception mode (S605). As this time, since the power transmitting device 101 is in the wide area power transmission mode, it receives the transmitted electric power and charges it to the battery 148 until the beacon signal oscillator 151 operates (S606).

When charging can be performed until the beacon signal oscillator 151 operates, the power receiving device 102 transitions to the beacon output mode (S607). After transmitting the beacon signal for a while, the power transmitting device 101 transitions to the centralized power transmission mode, and the power receiving device 102 transitions to the rectifying antenna power reception mode and performs charging (S608).

Incidentally, during the charging, when the power receiving device 102 moves, since it is necessary to adjust the directivity of the phased array antenna 117 of the power transmitting device 101 similarly to the flowchart which illustrates the operation of the power transmitting device 101 which is shown in FIG. 5, the power transmitting device 101 periodically switches to the beacon reception mode and the power receiving device 102 switches to the beacon output mode.

Upon completion of charging of the power receiving device 102 (S609: Yes), the power receiving device 102 does not transition to the beacon output mode while the power transmitting device 101 periodically transitions to the beacon reception mode. At this time, since it does not receive the beacon signal from the power receiving device 102, the power transmitting device 101 stops power transmission (S610).

Incidentally, in step S602, in a case where there is the battery remaining quantity (S602: Yes), it transitions to step S607.

According to the first embodiment, even when the battery remaining quantity of the power receiving device 102 is small and there is no electric power which can transmit the beacon signal, the RFID responder 143 which is loaded on the power receiving device 102 responds to the RFID reader which is loaded on the power transmitting device 101, and thereby it becomes possible to transfer the electric power in the wide area power transmission mode by making the RFID reader have the directivity by using the phased array antenna 117 of the power transmitting device 101 on the basis of a result of the response. Then, it can charge the battery 148 until the power receiving device 102 can transmit the beacon signal. When the beacon signal is transmitted from the power receiving device 102 to the power transmitting device 101 and the power transmitting device 101 receives it, a direction which is relative to the power receiving device 102 can be found on the basis of the beacon signal with even higher accuracy than the result of response of the RFID reader and therefore charging can be performed in that direction by a general wireless power transferring operation (the centralized power transmission mode).

Second Embodiment

Figure 7:
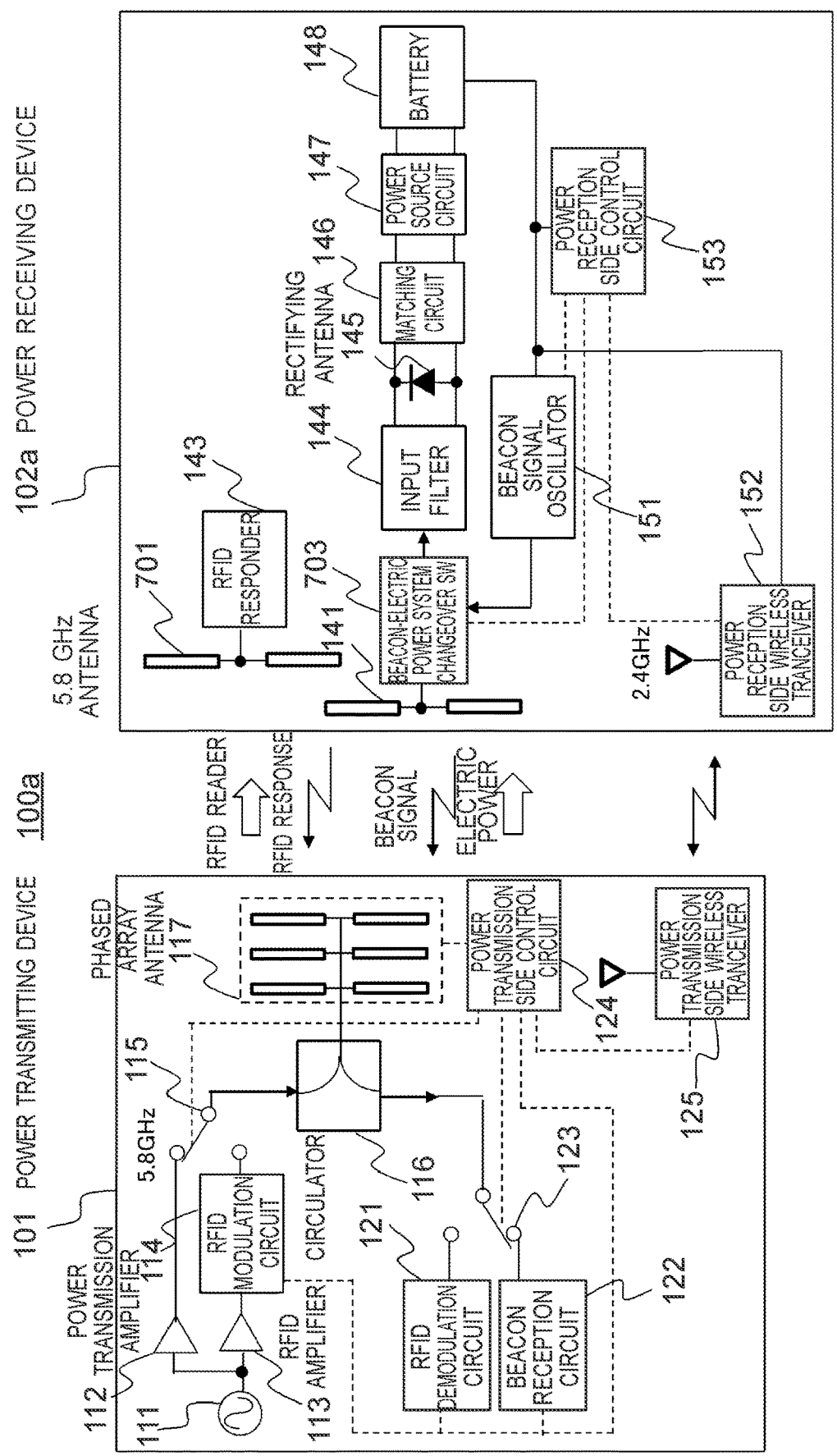
FIG. 7 is a diagram illustrating a configuration of a power transmitting and receiving system which pertains to a second embodiment.

FIG. 7 is a diagram illustrating a configuration of a power transmitting and receiving system 100a which pertains to the second embodiment. The power transmitting and receiving system 100a is configured by including a power receiving device 102a of a configuration which is different from the power receiving device 102 in the first embodiment.

As illustrated in FIG. 7, in the power receiving device 102a, which is used in the power transmitting and receiving system 100a which pertains to the second embodiment, the RFID responder 143 is connected to an RFID antenna (also, called a "5.8 GHz antenna") 701 and is not connected to the power reception side control circuit 153. That is, the RFID responder 143 continues to perform a passive operation regardless of the remaining quantity of the battery 148 of the power receiving device 102a and without being controlled by the power reception side control circuit 153. Although, in the first embodiment, the power reception antenna 141 also functions as the RFID antenna 701, it is different in that it possesses the RFID antenna 701 which is different from the power reception antenna 141 in the second embodiment.

A beacon-electric power system changeover switch 703 is connected to the power reception antenna 141. Further, the beacon-electric power system changeover switch 703 is connected to an output end of the beacon signal oscillator 151 and an input end of the input filter 144 and is configured to select one of them. The beacon-electric power system changeover switch 703 is of a configuration that, in the RFID-beacon changeover switch 142 in the first embodiment, functions of connecting to the RFID responder 143 and switching thereof are deleted.

According to the power transmitting and receiving system 100a which pertains to the second embodiment, the effects which are the same as those of the first embodiment can be obtained and, in addition, since the RFID antenna 701 which is connected to the RFID responder 143 is of a system which is different from a system which is driven by the battery 148 and under the control of the power reception side control circuit 153, the changeover switch for the RFID response becomes unnecessary. Accordingly, since a reduction of level dropping can be promoted against a reflected wave of the RFID responder 143 which is comparatively low in signal level, the detection sensitivity required in the RFID mode can be ensured and simplification of the changeover switch 703 can be promoted.

Third Embodiment

Figure 8:
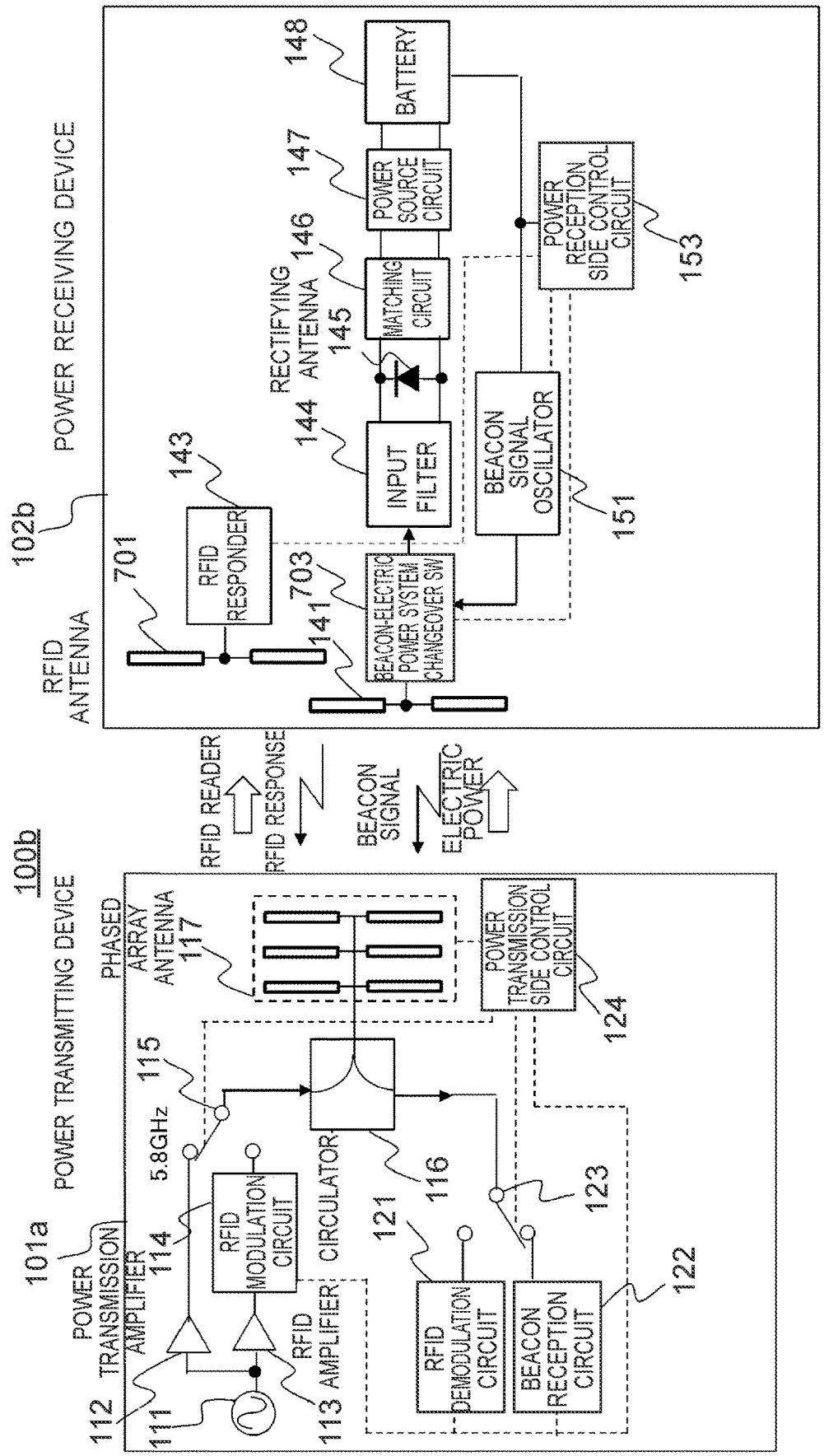
FIG. 8 is a diagram illustrating a configuration of a power transmitting and receiving system which pertains to a third embodiment.

FIG. 8 is a diagram illustrating a configuration of a power transmitting and receiving system 100b which pertains to the third embodiment. A power transmitting device 101a which is used in the power transmitting and receiving system 100b which pertains to the third embodiment is different in that the transmission side wireless machine 125 is deleted from the power transmitting device 101 used in the first and second embodiments. In addition, a power receiving device 102b is different in that the power reception side wireless machine 152 is deleted from the power receiving device 102a used in the second embodiment and the RFID responder 143 is connected to the power reception side control circuit 153.

The power transmitting device 101a can apply amplitude modulation to the RFID reader signal in the RFID modulation circuit 114 when it is in the RFID mode. This RFID reader signal to which the amplitude modulation is applied is demodulated in the RFID responder 143 of the power receiving device 102 and thereby data reception becomes possible. On the other hand, data such as identification information, a reception signal level, the battery remaining quantity, the priority order of charging, and so forth of the power receiving device 102b becomes reflection wave of the RFID reader signal from the RFID responder 143 and is output. The reflection wave is demodulated by the RFID demodulation circuit 121 of the power transmitting device 101a, and are input into the power transmission side control circuit 124. In the power transmission side control circuit 124, determination of the priority order of charging in a case of presence of the plurality of power receiving devices 102b, control of charging such as starting charging from a device which is smaller in the battery remaining quantity, and so forth are performed from those pieces of data.

According to the third embodiment, simplification and consumption power reduction of the power transmitting and receiving devices can be promoted by deleting the power transmission side wireless machine 125 and the power reception side wireless machine 152 and using the RFID responder 143 instead, while acquiring the same effects as the second embodiment.

Fourth Embodiment

Figure 9:
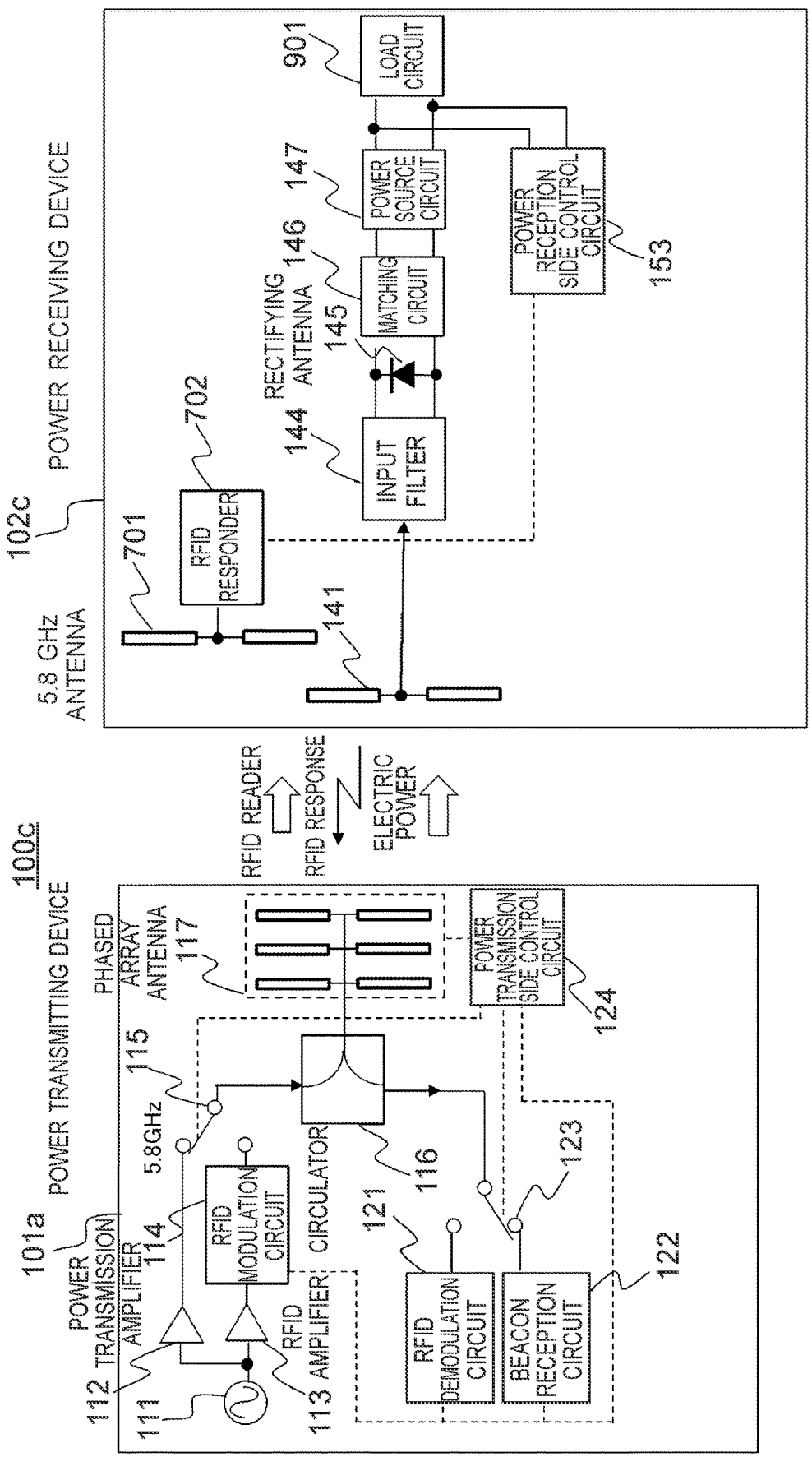
FIG. 9 is a diagram illustrating a configuration of a power transmitting and receiving system which pertains to a fourth embodiment.

FIG. 9 is a diagram illustrating a configuration of a power transmitting and receiving system 100c which pertains to the fourth embodiment. A power receiving device 102c which pertains to the fourth embodiment is different in that the battery 148 and the beacon signal oscillator 151 of the power receiving device 102b which pertains to the third embodiment are deleted and a load circuit 901 is connected instead.

According to the fourth embodiment, since position detection and charge control of the power receiving device 102c are possible by the RFID responder 702, power transfer to a device with no battery also becomes possible in addition to being able to obtain the same effects as the third embodiment.

Fifth Embodiment

Figure 10:
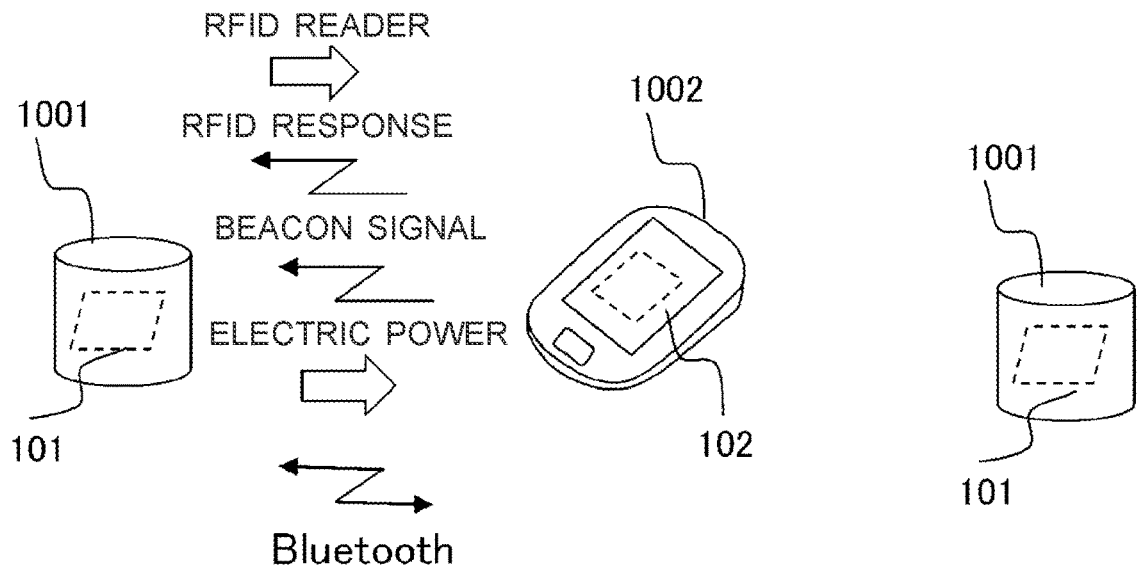
FIG. 10 is a diagram illustrating a configuration of a power transmitting and receiving system which pertains to a fifth embodiment.

FIG. 10 is a diagram illustrating a configuration of a power transmitting and receiving system 100d which pertains to the fifth embodiment. The power transmitting and receiving system 100d is configured by including the power transmitting device 101 which is loaded on a power transmitting device housing 1001 and the power receiving device 102 which is loaded on a portable terminal 1002.

The power transmitting device 101 and the power receiving device 102 are, any ones of the respective power transmitting devices and power receiving devices in the first embodiment to the fourth embodiment may be used.

According to the fifth embodiment, even though a battery remaining quantity of the portable terminal 1002 is small and thus the beacon signal cannot be transmitted, charging becomes possible by using the RFID. Further, during charging, in a case where the portable terminal 1002 moved, the direction of the phased array antenna 117 deviates and therefore a charging direction can be adjusted by making it periodically transmit the beacon signal. Accordingly, it becomes possible to charge the portable terminal 1002 even while moving. In addition, a wireless machine which is used for charging control is, circuit simplification of the power receiving device becomes possible by using Bluetooth (registered trademark) which is generally loaded on the portable terminal 1002.

Sixth Embodiment

Figure 11:
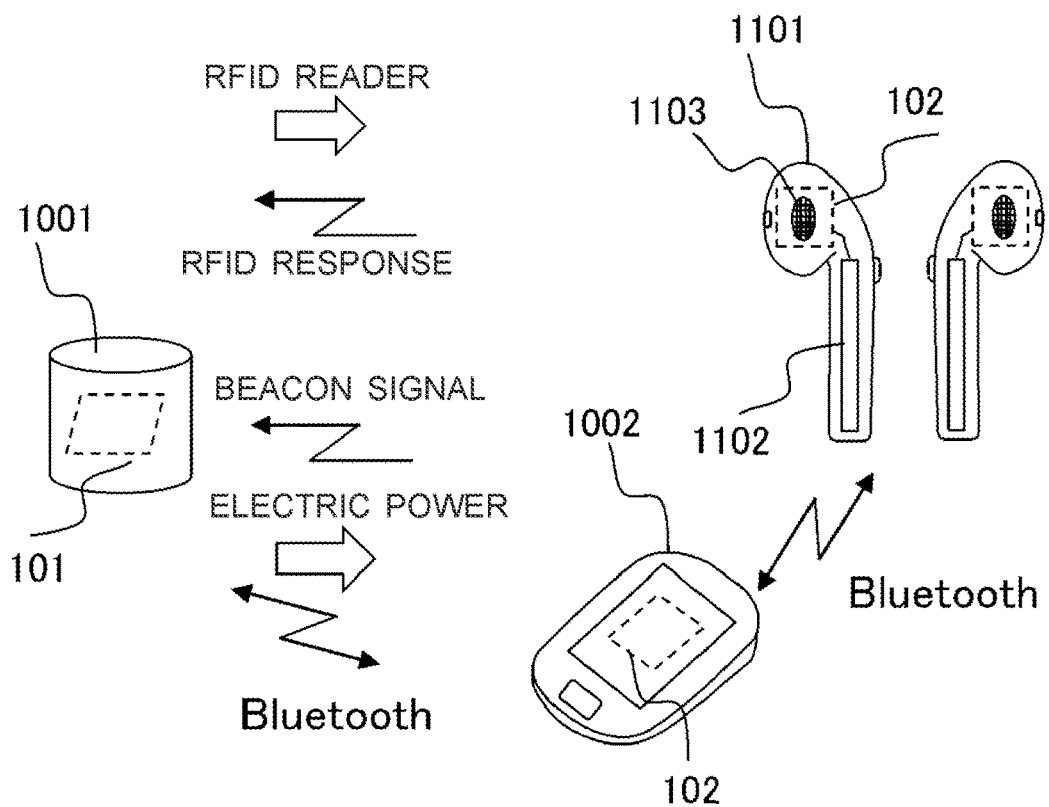
FIG. 11 is a diagram illustrating a configuration of a power transmitting and receiving system which pertains to a sixth embodiment.

FIG. 11 is a diagram illustrating a configuration of a power transmitting and receiving system 100e which pertains to the sixth embodiment. A wireless earphone 1101 which is illustrated in FIG. 11 includes a power reception antenna 1102 and a loudspeaker 1103. Incidentally, since the wireless earphone 1101 is in the form of bilateral symmetry, a number is assigned to only one of them. The power receiving device 102 in the first embodiment to the fourth embodiment is loaded on the wireless earphone 1101, and the power reception antenna 1102 is loaded on a protruded part that a battery and so forth of the wireless earphone 1101 are to be loaded.

In addition, in FIG. 11, the power transmitting device 101 charges the portable terminal 1002 and charges the left and right wireless earphones 1101. The portable terminal 1002 transmits music data to the wireless earphones 1101 via Bluetooth (registered trademark). Although the power receiving device 102 of the portable terminal 1002 performs charging control by using the power transmitting device 101 and Bluetooth (registered trademark), the portable terminal 1002 also performs transmission of the music data by using Bluetooth (registered trademark). Accordingly, it is possible for the power transmitting device 101 to communicate with the wireless earphones 1101 via the portable terminal 1002 by transmitting charging control data from the portable terminal 1002 to the wireless earphones 1101 by superimposing it on the music data in time division and so forth. Since, in general, the wireless earphones are small in size, a wireless communication distance for Bluetooth (registered trademark) and so forth cannot be lengthened. However, extension of the communication distance of the wireless earphone 1101 can be promoted by performing wireless communication with the power transmitting device 101 via the portable terminal 1002.

Seventh Embodiment

Figure 12:
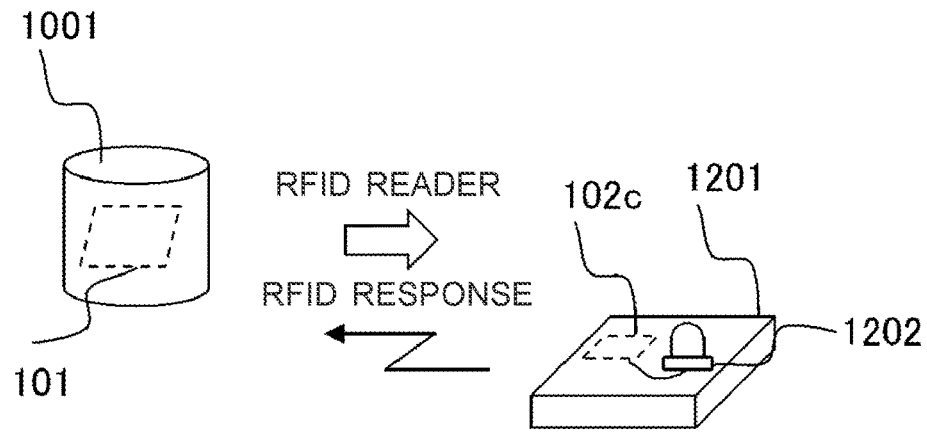
FIG. 12 is a diagram illustrating a configuration of a power transmitting and receiving system which pertains to a seventh embodiment.

FIG. 12 is a diagram illustrating a configuration of a power transmitting and receiving system 100f which pertains to the seventh embodiment. In the present embodiment, an LED apparatus has a power receiving device built in it. The LED apparatus is equipped with an LED 1202 on an outer surface of a housing 1201, and the power receiving device 102c in the fourth embodiment is loaded in the housing 1201. The LED 1202 corresponds to the load circuit 901. The power transmitting device 101 is of a configuration that it performs direction detection of the power receiving device 102c by using the RFID and then enters the power transmission mode and does not load the beacon signal oscillator and the battery thereon.

In the above configuration, since the power receiving device 102c can be realized by a simple configuration, a configuration which is suited to a case of transferring the power to the LED 1202 and so forth is obtained.

Figure 13:
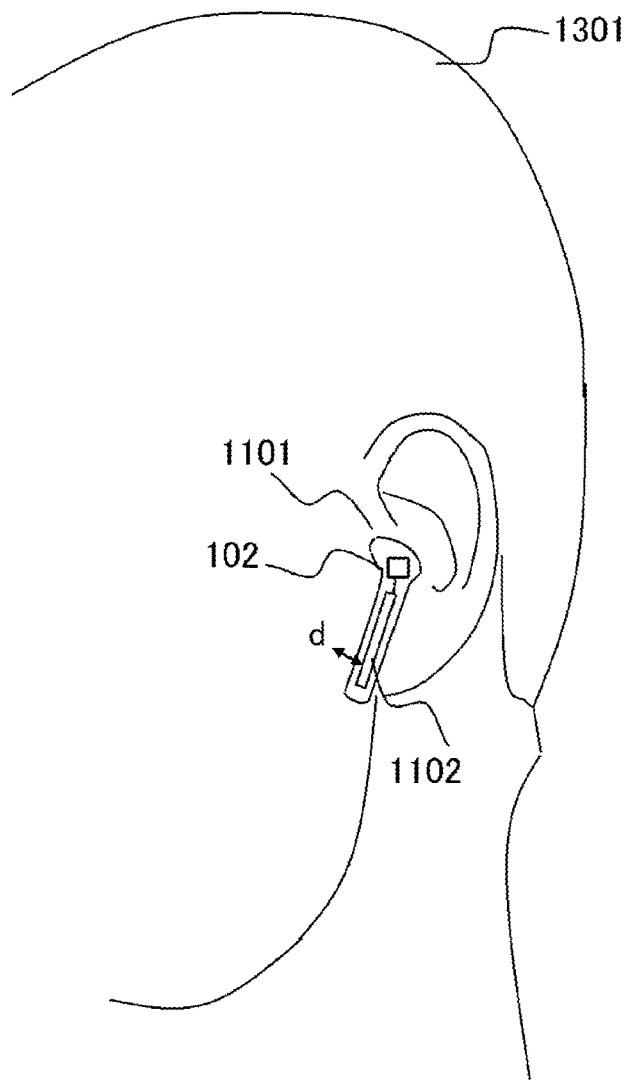
FIG. 13 is a diagram illustrating a state where a wireless earphone has been mounted on the head.

FIG. 13 is a diagram illustrating a state where the wireless earphone 1101 has been mounted on the head 1301. 1302 denotes a height from an antenna to the face. In a state where the wireless earphone 1101 is mounted on the head 1301, it is desirable that a distance d between the power reception antenna 1102 and the skin of the face is equal to a quarter wavelength of a radio wave which is used for wireless communication with the portable terminal 1002. Considering that the radio wave from the portable terminal 1002 is reflected from the skin and the phase of a reflected wave thereof is reversed, when the distance d becomes equal to the quarter wavelength, the reflected wave is in phase with a direct wave and therefore an antenna gain can be heightened. As one example, since the quarter wavelength in a case where 5.8 GHz is used as the frequency is 1.29 cm, the antenna gain can be heightened by designing such that the distance from the antenna to the skin becomes 1.29 cm.

When designing, it may also be configured such that in the wireless earphone 1101, a distance between the most protruded part, for example, an extension line (an extension surface) of a leading end face of a part which is inserted into the ear and the power reception antenna 1102 is regarded as the distance d and this is equal to the quarter wavelength.

Eighth Embodiment

Figure 14:
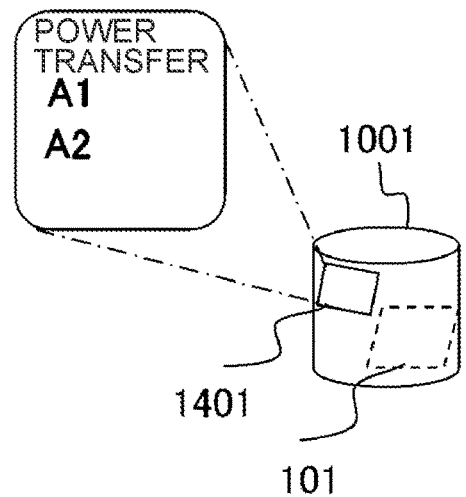
FIG. 14 is a diagram illustrating a configuration of a power transmitting and receiving system which pertains to an eighth embodiment.

FIG. 14 is a diagram illustrating a configuration of a power transmitting and receiving system 100g which pertains to the eighth embodiment. The power transmitting device 101 which is used in the power transmitting and receiving system 100g is built in the power transmitting device housing 1001. In addition, a display 1401 is installed on an outer surface of the power transmitting device housing 1001. Numbers and names (illustrated by "A1", "A2" in FIG. 14) of the portable terminals to which the power transmitting device 101 is transferring the electric power at present. Thereby, that the power transmitting device 101 transfers the electric power to which portable terminal can be confirmed. Incidentally, the power receiving device 102 which is used in the present embodiment may be the portable terminal, the wireless earphone, the LED device and any kind is acceptable.

Ninth Embodiment

Figure 15:
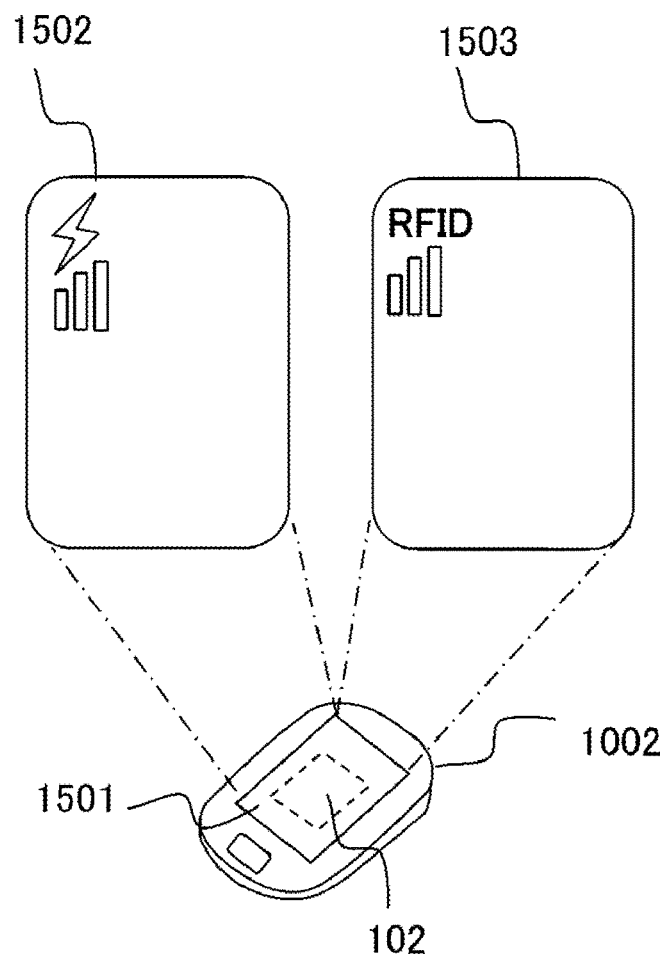
FIG. 15 is a diagram illustrating a configuration of a power transmitting and receiving system which pertains to a ninth embodiment.

FIG. 15 is a diagram illustrating a configuration of a power transmitting and receiving system 100h which pertains to the ninth embodiment. The power transmitting and receiving system 100h displays a state where in which mode it is such as the charging mode, the RFID mode, and so forth as well as a power reception level on a liquid crystal screen 1501 of the portable terminal 1002 which has the power receiving device 102 built in it. Liquid crystal screens 1502, 1503 indicate display examples of the liquid crystal screen 1501. Owing to this display, a user can know that the power receiving device 102 receives the electric power at a power reception level of which extent. Then, in a case where the power reception level is low by any chance, he/she can move to an efficient position carrying the portable terminal 1002 in hand.

The abovementioned respective embodiments do not limit the present invention. Various modified aspects which do not deviate from the gist of the present invention are included in the present invention.

LIST OF REFERENCE SIGNS

100: power transmitting and receiving system
101: power transmitting device
102: power receiving device
141: power reception antenna
142: RFID-beacon changeover switch
143: RFID responder
145: rectifying antenna
151: beacon signal oscillator
153: power reception side control circuit

The invention claimed is:
1. A wireless power receiving device comprising:
an RFID responder;
a beacon signal oscillator which generates a beacon signal;
a power reception antenna;
an RFID-beacon changeover switch which is connected to each of the beacon signal oscillator, the RFID responder and the power reception antenna; and
a power reception side control circuit which performs switching control of the RFID-beacon changeover switch,
wherein the beacon signal oscillator is connected to a first input end of the RFID-beacon changeover switch,
the RFID responder is connected to a second input end of the RFID-beacon changeover switch,
the power reception antenna is connected to a first output end of the RFID-beacon changeover switch, and
in a case where there is no electric power for transmitting the beacon signal in the wireless power receiving device, the power reception side control circuit is configured to control to connect to a first system which connects the RFID responder with the power reception antennal and disconnects the beacon signal oscillator from the power reception antenna, and in a case where there is the electric power for transmitting the beacon signal in the wireless power receiving device, the power reception side control circuit is configured to control to connect to a second system which connects the beacon signal oscillator with the power reception antenna and disconnects the RFID responder from the power reception antenna.

2. The wireless power receiving device according to claim 1, further comprising:
a rectifying antenna which rectifies the electric power that the power reception antenna receives; and
a battery,
wherein the rectifying antenna is connected between a second output end of the RFID-beacon changeover switch and the battery, and the electric power that the rectifying antenna rectifies is charged to the battery, and
the power reception side control circuit, in a case where a remaining quantity of the battery is smaller than a remaining quantity which is necessary for transmission of the beacon signal, is configured to:
control to connect to the first system, in a case where the remaining quantity of the battery is equal to or larger than the remaining quantity which is necessary for transmission of the beacon signal,
control to connect to the second system, and in a case where the power reception antenna is receiving the power,
control to connect to a third system which connects the power reception antenna with the rectifying antenna and disconnects it from both of the beacon signal oscillator and the RFID responder.

3. The wireless power receiving device according to claim 2,
wherein the power reception side control circuit controlled to connect to the third system and thereafter controls to switch to the second system and the third system alternately in a predetermined cycle.

4. The wireless power receiving device according to claim 2,
wherein the RFID responder, the beacon signal oscillator and the rectifying antenna are connected in series with one another, and
the RFID-beacon changeover switch is configured by including a first field effect transistor whose drain and source are connected between the RFID responder and the beacon signal oscillator, a second field effect transistor whose drain and source are connected between the beacon signal oscillator and the rectifying antenna, and a third field effect transistor whose drain and source are connected between the beacon signal oscillator and the power reception side control circuit.

5. A wireless earphone equipped with the wireless power receiving device according to claim 1.

6. A wireless power receiving device comprising:
an RFID responder;
an RFID antenna which is connected to the RFID responder and transmits an RFID response signal thereto;
a beacon signal oscillator which generates a beacon signal;
a power reception antenna;
a beacon-electric power system changeover switch which is connected to each of the beacon signal oscillator and the power reception antenna;
a rectifying antenna which rectifies the electric power that the power reception antenna receives; and
a power reception side control circuit which performs switching control of the beacon-electric power system changeover switch,
wherein the RFID responder transmits the RFID response signal from the RFID antenna without receiving control instructions from the power reception side control circuit, and
in a case where there is no electric power for transmitting the beacon signal in the wireless power receiving device, the power reception side control circuit is configured to control to connect to a fourth system which connects the power reception antenna with the rectifying antenna and disconnects the power reception antenna from the beacon signal oscillator, and in a case where there is the electric power for transmitting the beacon signal in the wireless power receiving device, the power reception side control circuit is configured to control to connect to a fifth system which connects the beacon signal oscillator with the power reception antenna and disconnect the rectifying antenna from the power reception antenna.

7. The wireless power receiving device according to claim 6, further comprising a battery which is configured to charge the electric power that the rectifying antenna rectifies,
wherein the power reception side control circuit, in a case where a remaining quantity of the battery is smaller than a remaining quantity which is necessary for transmission of the beacon signal, is configured to control to connect to the fourth system, and in a case where the remaining quantity of the battery is equal to or larger than the remaining quantity which is necessary for transmission of the beacon signal, is configured to control to connect to the fifth system.

8. The wireless power receiving device according to claim 7,
wherein the power reception side control circuit is configured to control to connect to the fifth system and thereafter controls to switch to the fourth system and the fifth system alternately in a predetermined cycle.

9. A wireless power transmitting device comprising:
a power transmission amplifier;
an RFID modulation circuit and an RFID demodulation circuit;
a beacon reception circuit;
a phased array antenna;
a first switching circuit which switches connection between the phased array antenna and each of the power transmission amplifier and the RFID modulation circuit;
a second switching circuit which switches connection between the phased array antenna and each of the RFID demodulation circuit and the beacon reception circuit; and
a power transmission side control circuit which controls operations of the first switching circuit, the second switching circuit and the phased array antenna,
wherein the phased array antenna is connected with each of the first switching circuit and the second switching circuit, and
the power transmission side circuit is configured to:
control to connect the RFID modulation circuit with the phased array antenna via the first switching circuit,
control to connect the RFID demodulation circuit with the phased array antenna via the second switching circuit, and when the phased array antenna receives an RFID response that a wireless power receiving device outputs,
control power transmission in a wide area power transmission mode for transmitting electric power from the phased array antenna toward a relatively wide angle direction which includes a direction that it receives the RFID response, control to connect the beacon reception circuit with the phased array antenna via the second switching circuit, and when the phased array antenna receives a beacon signal that the wireless power receiving device outputs, and control power transmission in a centralized power transmission mode for transmitting the electric power from the phased array antenna toward a relatively narrow angle direction which contains a direction that it receives the beacon signal.

10. The wireless power transmitting device according to claim 9, further comprising a display which is configured to display identification information on the wireless power receiving device which becomes a power transmission object.

* * * * *